(12) United States Patent
Golan et al.

(10) Patent No.: US 7,397,822 B2
(45) Date of Patent: Jul. 8, 2008

(54) METHOD AND SYSTEM FOR COMPENSATING FOR TIMING VIOLATIONS OF A MULTIPLEX OF AT LEAST TWO MEDIA PACKET STREAMS

(75) Inventors: Oded Golan, Tel Aviv (IL); Gilat Avieli, Jerusalem (IL); Eran Avieli, Givat Shmuel (IL); Shlomo Abuddi, Petah Tikva (IL); David Kalma, Ramat Gan (IL)

(73) Assignee: Bigband Network Inc.

( * ) Notice: Subject to any disclaimer, the term of this patent is extended or adjusted under 35 U.S.C. 154(b) by 885 days.

(21) Appl. No.: 10/619,900

(22) Filed: Jul. 14, 2003

(65) Prior Publication Data

US 2004/0170199 A1    Sep. 2, 2004

Related U.S. Application Data

(60) Provisional application No. 60/406,190, filed on Aug. 26, 2002.

(51) Int. Cl.
*H04J 3/00* (2006.01)

(52) U.S. Cl. ............... 370/498; 370/503; 370/509; 370/535; 370/389

(58) Field of Classification Search ............... 370/516, 370/506, 512, 352, 503
See application file for complete search history.

(56) References Cited

U.S. PATENT DOCUMENTS 6,233,238 B1 *   5/2001   Romanowski et al. ...... 370/389

* cited by examiner

*Primary Examiner*—Chi Pham
*Assistant Examiner*—Albert T. Chou
(74) *Attorney, Agent, or Firm*—Oren Reches

(57) ABSTRACT

The invention provides a system and method for compensating for timing violations of a multiplex of at least two streams of media packets. The method includes the steps of: receiving the multiplex; associating a transmitter timing information to media packets; whereas the multiple media packet streams are associated to different time bases; transmitting the media packets and the associated transmitter timing information over a timing violation inducing communication channel to a receiver; receiving, by the receiver, the transmitter timing information and the media packets; providing at least one timing violation compensated stream of media packets in response to the transmitter timing information.

19 Claims, 4 Drawing Sheets

20

METHOD AND SYSTEM FOR COMPENSATING FOR TIMING VIOLATIONS OF A MULTIPLEX OF AT LEAST TWO MEDIA PACKET STREAMS

RELATED APPLICATIONS

This application claims the benefit of U.S. provisional patent application Ser. No. 60/406,190 filed 26 Aug. 2002.

FIELD OF THE INVENTION

The present invention relates to communication methods and systems in general, and to methods and systems for transmitting digital video over general data communication lines, in particular.

BACKGROUND OF THE INVENTION

Motion Pictures Expert Group

Methods and systems for compressing and transmitting media signals are known in the art. Compressed digital video is largely becoming the preferred medium to transmit to video viewers everywhere. Part of the Moving Pictures Experts Group (MPEG) specifications are standardized methods for compressing and transmitting video. Various audio compression techniques are also known in the art. In general, MPEG is used today for transmitting video over terrestrial, wireless, satellite and cable communication channels and also for storing digital video.

An audio stream is organized as an ordered sequence of frames. A video stream is usually organized as an ordered sequence of pictures, each picture includes a plurality of pixels. A video picture includes a plurality of slices, each slice including a plurality of macro blocks. The audio and video streams are provided to an audio encoder and video encoder respectively to generate compressed audio and video elementary streams, also referred to as elementary streams.

Elementary streams are packetized to produce PES packets. PES packets made up of elementary streams that form a program share a common time base. The PES packets may also include additional information. PES packets of distinct elementary streams can be arranged as either a Program Stream or a Transport Stream. A Transport Stream that includes a single program is known as single program transport stream while a transport stream that includes multiple programs is known as multiple program transport stream. The latter combines multiple programs with multiple independent time bases into a single stream. Transport Streams include transport packets of 188 bytes. Transport Stream packets start with a transport packet header. The header includes a packet ID (PID). Transport Stream packets of one PID value carry data of a single elementary stream. Transport Streams include Program Specific Information (PSI) tables. The PSI tables specify which PIDs and accordingly which elementary streams are associated to form each program.

Transport Streams are provided, usually via a communication medium, to a target decoder, that decodes the encoded elementary streams within the Transport Stream. The decoding of encoded elementary streams is based upon timing information embedded within Transport packets, packs and PES packets.

MPEG specifications define a Program Time Clock (PTC) for each transmitted program. Samples of this clock are called Program Clock References (PCR). Sample values are carried within the MPEG stream. In the broadest sense, these values define timings for the decoder (decoding and presentation times) and transmission and multiplexing constraints. As the order of transmitted packets may differ from the order of decoding these packets MPEG defines both decoding time stamps (DTS) and presentation time stamps (PTS), DTS indicating the time that an access unit is decoded at the target decoder to provide a presentation unit, PTS indicating the time that the presentation unit is presented at the target decoder.

The importance of timing is apparent in many different aspects. One such aspect is the requirement for synchronizing between audio and video streams at the receiver end. Another, even more important issue is the requirement for the receiver to decode and display data at substantially fixed rates. For example, a television set in the United States is required to present video frames at a rate of 29.97 per second. An additional artifact associated with incorrect timing information is color loss on television sets connected to the decoders' outputs. For these reasons, the receiver requires a buffer in order to regulate the timing of the different presentation units (such as video frames). If the receiver and transmitter clocks operate at different rates, a buffer overflow or underflow may occur at some time. Such a rate deviation shall either cause the receiver to discard and lose data in the case of overflow or to have nothing to present to the viewer in the case of underflow. Both cases are unacceptable. Note that this condition occurs even if the transmitter notifies the receiver what is the stream's bit-rate.

The problem stems from the fact that if the clock rates are different, the transmitter and receiver don't agree on the measurement of time and therefore can't agree on the measurement of rates. The MPEG-Transport specifications allow for a difference of few parts per million between any two clocks.

One of the methods, known in the art for operating under these strict conditions utilizes a Phase Locked Loop (PLL) unit, at the receiver end, which constantly attempts to emulate the clock of the transmitter. According to this method, the transmitter transmits timing information to the receiver. The PLL unit at the receiver end attempts to lock the receiver clock to operate in synchronicity with the clock of the transmitter, using timing information (PCR), embedded in the MPEG packets. The MPEG specification provides an example for this architecture. This method imposes a limitation whereby, the timing information sent by the transmitter must arrive at the receiver at exact predefined points in time. A deviation from these exact times (i.e., the communication channel was faster or slower than what it was supposed to have been) is called a jitter. Systems using this method are characterized by a threshold, set for the acceptable jitter level. Usually the smaller the jitter is, the faster the receiver can lock its clock to the transmitter clock. In the case of extremely large jitter, the receiver may be unable to lock to the transmitter clock. In the MPEG Transport specification, the allowable jitter level is no more than 500 nanoseconds.

Various time recovery schemes are describes in the following U.S. patents: U.S. Pat. No. 6,356,567 of Anderson et al., U.S. Pat. No. 6,292,490 of Gratacap et al. and U.S. Pat. No. 6,208,666 of Lawrence et al. Most patents include PID filtering prior to timing reconstruction of a single program, based upon said programs PCR. Accordingly, each program required a dedicated timing reconstruction unit, such as a PLL.

Real Time Protocol

It is noted that MPEG Transport specification does not allow loss of packets. Hence, transmitting MPEG transport over conventional communication systems such as Internet Protocol (IP), requires external adjusting intervention, so as to comply with the above timing requirements. One such method for adjusting a conventional communication system is by using Real Time Protocol (RTP) over UDP over IP.

There are various RFCs relating to RTP, such as RFC 1889 ("RTP A Transport Protocol for Real-Time Applications), RFC 2250 ("RTP payload Format for MPEG1/MPEG2 Video", RFC 2343 ("RTP Payload Format for Bundled MPEG).

Real Time Protocol is a standard for transporting real time data, including audio and video streams. RTP includes a data part and a control part named RTCP. The data part involves packetizing real time streams into RTP packets, whereas each RTP packet include RTP payload and fixed RTP header. The RTP header may be 16-bytes long (it may be followed by a header extension) and includes multiple fields, such as a 32-bit timestamp field.

According to RTP standards (for example RFC 2250) the timestamp embedded within an RTP packet originating from a certain program must be synchronized with the time base of the program. This timestamp represents the target transmission time of the first byte of the RTP packet payload. In this manner, the receiver can time each packet accurately according to the transmitter's timestamp and the network-induced jitter is removed. The synchronization allows to attach the same timestamp to all the RTP packets that make up an audio or video frame.

Said synchronization requires a PLL in the transmitter as well as in the receiver. Since network induced jitters are significantly larger than the MPEG allowed jitter, said PLLs are usually in addition to the PLL included within MPEG decoder

Multiple Program Transport Streams

FIG. 1 illustrates a prior art system 20 for transmitting and decoding a multiple program transport stream 31. System 20 includes a source 22 of multiple program transport streams, a PID switch and splicer 24, an array of transmitter PLLs (denoted TX PLL) 26(1)-26(J), an RTP packet generator 28, a transmitter end communication interface 30, a timing violation inducing communication channel 40, a receiver end communication interface 50, an RTP splicer 52, a PID switch 54, an array of receiver PLLs (denoted RX PLL) 56(1)-56(J), buffering and retrieval unit 58 and a decoder 60. It is noted that for simplicity of explanation various components such as controllers and a more detailed description of the timing violation inducing communication channel were omitted. It is noted that links that convey only timing information are illustrated by dashed lines.

Multiple program transport stream (MPTS) 31 may have up to J different programs, each program has an independent time base. Accordingly, in order to produce J RTP time bases, these programs must be separated, by PID switch and splicer 24 such that each transmitter PLL 26(j) receives timestamps of a single programs, to allow the generation of RTP timestamps that are synchronized with the time base of each program. Multiple RTP timestamps are provided to RTP packet generator 28 from transmitter PLLs 26(1)-26(J) while the transport packets are provided to the RTP packet generator 28 from PID switch and splicer 24.

RTP packet generator 28 inserts the RTP timestamps as well as the transport stream packets into RTP packets and sends RTP packets to the transmitter end communication interface 30. Transmitter end communication Interface 30 may further process the RTP packets to provide timing violation inducing communication channel compliant (TVICCC) packets (also referred to as "communication channel format packets") and sends the TVICC packets over timing violation inducing communication (TVIC) channel 40 towards the receiver end communication interface 50. Interfaces 30 and 50 usually handle lower layer communication protocols, such as data link layers but may also be configured to handle network and transmitter communication protocol layers.

Receiver end communication interface 50 converts the TVICCC packets to RTP packets that are sent to PID switch and splicer 54. PID switch and splicer 54 sends RTP timestamps to transmitter PLLs 56(1)-56(J) while sending the transport stream packets embedded within the RTP packets to buffering and retrieval unit 58.

Buffering and retrieval unit 58 may include a first level of de-jittering buffers, that are responsive to RTP timestamps, and a second layer of transport stream buffers that are responsive to PCR values. The RTP timestamp is used to estimate and reduce any timing violation inducing network induced jitter and to synchronize relative time drifts between the transmitter and receiver. While the RTP timestamp is used to control the retrieval of data from the first level buffers, the MPEG timestamps (such as PCR) are used to control the retrieval of data (such as transport stream packet payload) from the second level buffers, to the decoder.

It is noted that for simplicity of explanation other processes related to RTP packets, as well as a description of RTCP related process were omitted.

It is further noted that RFC 2250 was found to be suitable only for the transmission of single program transport stream. Accordingly, an extension of RTP payload Type for Multiple Program Transport Stream was drafted. This extension still required receiver PLLs as well as transmitter PLLs.

The extension provides a buffer model that assumes that an audio and video elementary streams are converted to PES packets, to transport stream packets and to RTP packets. The multi-staged structure includes an input IP de-jitter buffer that is responsive to the RTP timestamps, a transport stream buffer and multiple audio, video and system buffers. The retrieval of data from the transport stream buffer is responsive to PCRs. Video is sent from the transport stream buffer to a MPEG de-multiplex buffer. Audio is sent from the transport stream buffer to an audio main buffer. Other information is sent from the transport stream buffer to a system main buffer. This illustration is schematic and omits various operations such as PID filtering that is implemented along the reception path, as well as omits several communication layer associated operations.

PLLs have complex filters and consume processing power, especially as they have to handle high jitter and changing delays introduced by the timing violation inducing communication channels.

There is a need to reduce the amount of PLLs required for transmission and timing reconstruction of a multiplex of media streams that are associated with multiple time bases.

SUMMARY OF THE PRESENT INVENTION

The invention relates to a method and system for compensating for timing violations of a multiplex of at least two media packets streams associated with independent time bases. The timing violations are introduces by a timing violation inducing communication channel, as well as interfaces and other units that are connected to said TVIC channel. The invention compensates for these timing violations by generating a transmitter timing information, such as a transmitter timestamp, and by tracking the transmitter timing information timestamp at the receiver. The transmitter timing information is generated by a process that does not require synchronization with any time base associated with any of the received media packet streams. The lack of synchronicity reduces the complexity of both transmitter and receiver, especially by reducing the amount of PLL that are required for transmitting a multiplex of multiple media packet streams that have different time bases.

The invention provides a system for reducing jitter of a multiple program transport stream, the system includes a transmitter and a receiver connected over a high jitter communication channel. The transmitter is operable to receive the multiple program transport stream, to associate a transmitter timing information to the packets of the multiple program transport stream, and to transmit the packets of the multiple program transport stream and the associated transmitter timing information over the high jitter communication channel towards the receiver. The receiver is operable to receive the transmitter timing information and the packets of the multiple program transport stream, and to provide at least one low jittered program in response to the transmitter timing information.

The invention provides a method for compensating for timing violations of a multiplex of at least two media packet streams, the method includes the steps of: receiving the multiplex, associating transmitter timing information to media packets that belong to the multiplex; transmitting the media packets and the associated transmitter timing information towards a receiver, over a TVIC channel; whereas the at least two media packet streams are associated with different time bases; receiving the transmitter timing information and the media packets; and providing at least one timing violation compensated media packet stream in response to the transmitter timing information.

The invention provides a system for compensating for timing violations of a multiplex of at least two media packet streams, the system includes a transmitter, operable to receive the multiplex, to associate transmitter timing information to media packets that belong to the multiplex, and to transmit the media packets and the associated transmitter timing information towards a receiver, over a TVIC channel; whereas the at least two media packet streams are associated with different time bases; and a receiver, operable to receive the transmitter timing information and the media packets, and to provide at least one timing violation compensated media packet stream in response to the transmitter timing information.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

The following description usually related to MPEG compliant media streams and MPEG transport stream packets. Those of skill in the art will appreciate that the invention can be applied to other compression schemes and other communication protocols.

The present invention is based upon the assumption that timing recovery of multiple program transport streams does not require the transmitter and receiver to synchronize to the time base of the any of the programs. Especially, there is no need to separately synchronize to each different time base.

The present invention is based upon the assumption that when multi program transport stream is received, by the transmitter, over a low jitter channel and then is transmitted over a TVIC channel then the reconstruction of the low jitter will provide expectable performances.

Figure 1:
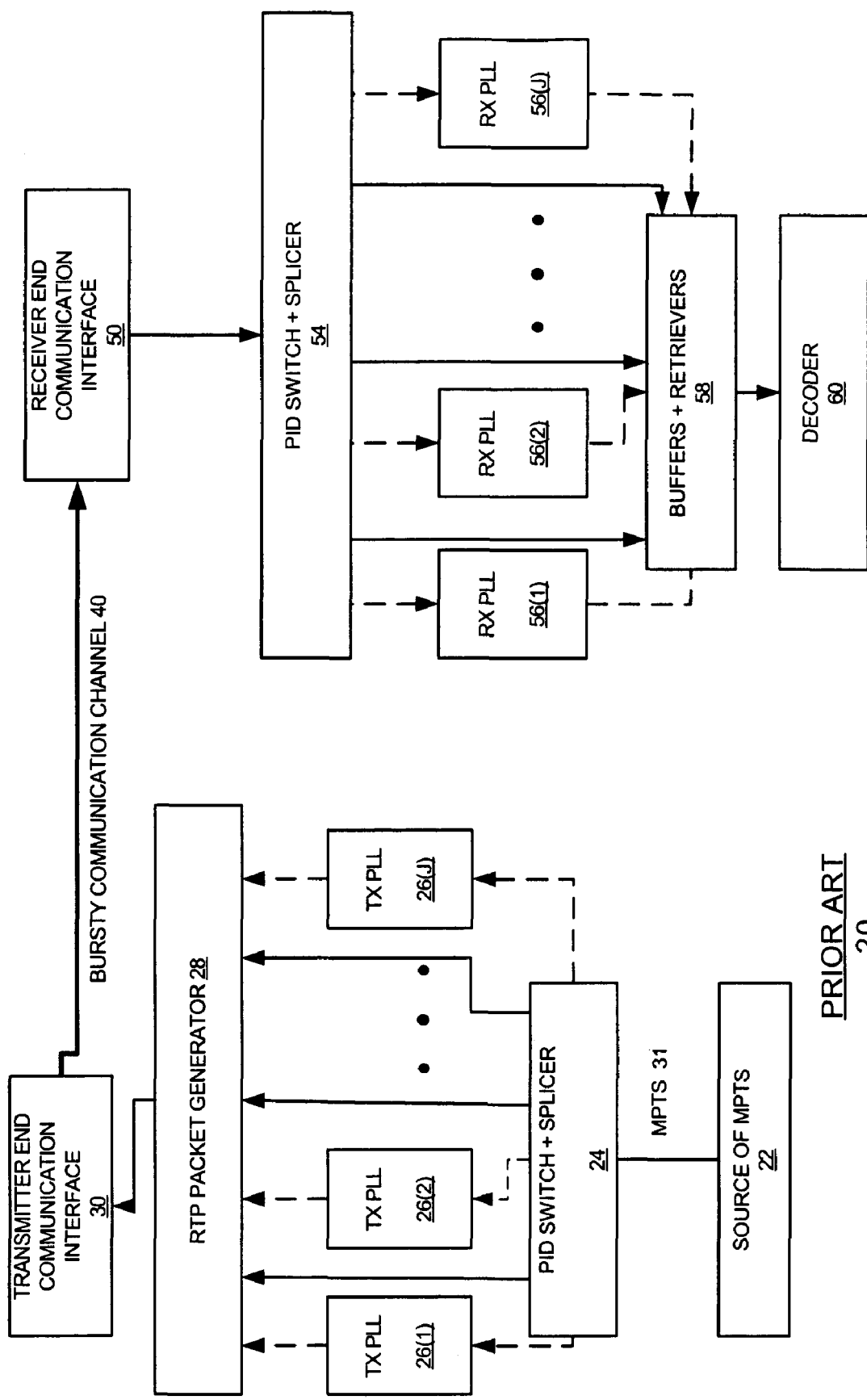
FIG. 1 is a schematic illustration of a prior art system for transmitting and decoding a multiple program transport stream.
Figure 2:
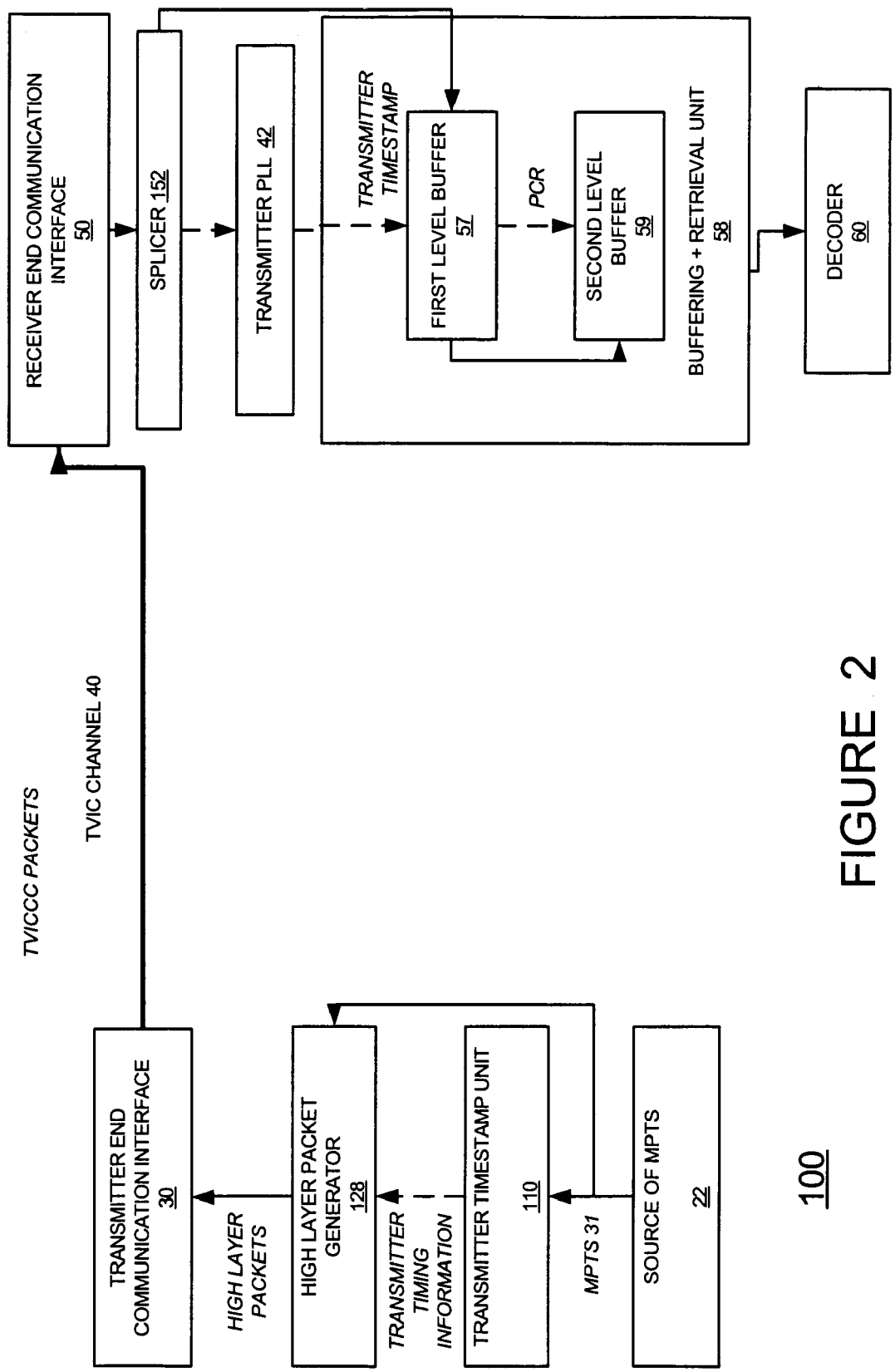
FIG. 2 illustrates a system for transmitting a multiple program transport stream over a TVIC channel, in accordance to an embodiment of the invention.

FIG. 2 illustrates a system 100 for transmitting a multiple program transport stream over a TVIC channel 40. System 100 includes a transmitter (that includes transmitter time base generator, such as transmitter timestamp unit 110, as well as high layer packet generator 128 and transmitter end communication interface 30), a receiver (that includes splicer 152, transmitter PLL 42, and buffering and retrieval unit 58). The transmitter is connected to the receiver over the TVIC channel 40. System 100 is connected to multi program transport stream source 22 over a low jitter communication channel and also is connected to decoder 60.

The transmitter includes transmitter timestamp unit 110, high layer packet generator 128 and transmitter end communication interface 30. Transport stream packets from multiple programs are fed to transmitter timestamp unit 110, that attaches a transmitter timestamp to each packet as it receives the packet The timestamps and the associated transport stream packets are encapsulated into a high layer protocol compliant packet, such as Ethernet packet, IP packet and the like. These high layer communication protocols do not include RTP protocol.

It is noted that high layer packet generator 128 as well as transmitter end communication interface 30 are described as two distinct entities, but this is not necessarily so, as they can be combined. It is further noted that the transmitter, as well as the receiver, may be implemented by combining both software and hardware.

Figure 3:
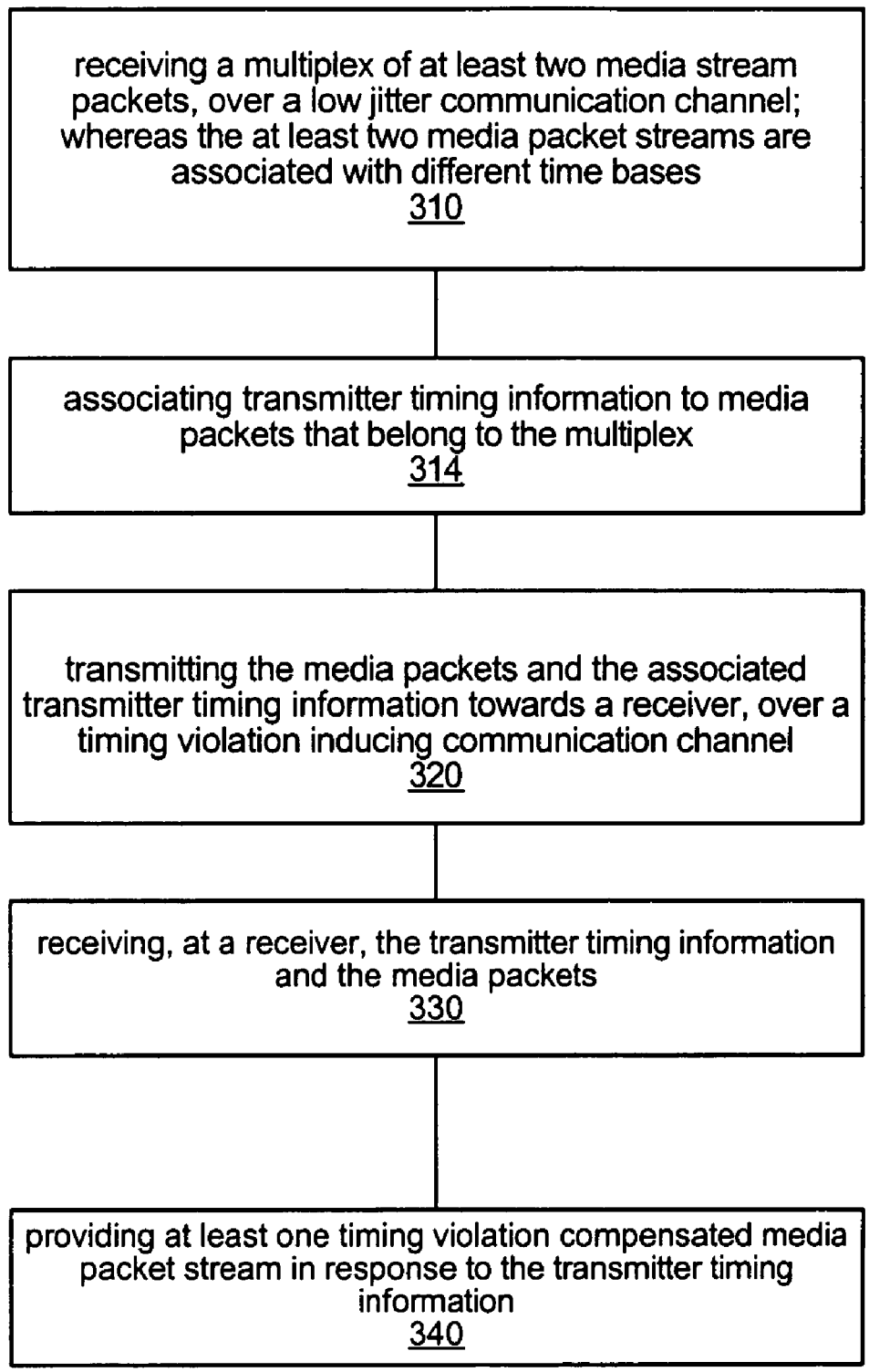
FIG. 3 is a flow chart illustrating a method in accordance to an embodiment of the invention.
Figure 4:
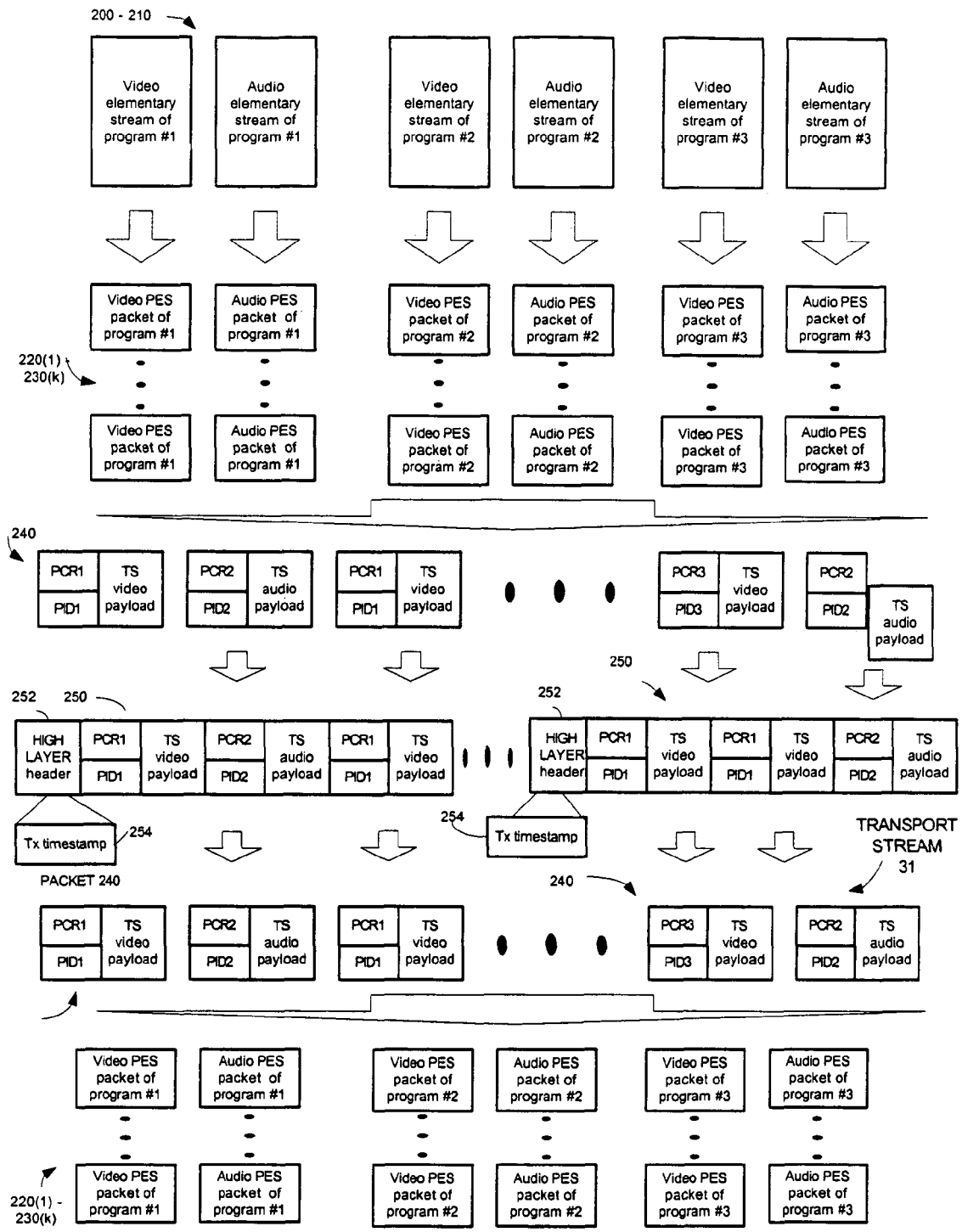
FIG. 4 illustrates various packet types and elementary streams, in accordance to an embodiment of the invention.

The operation of system 100 will be further illustrated in conjunction with the flow chart of FIG. 3 and the elementary streams and packets of FIG. 4.

The flow chart illustrates method 300 for compensating for timing violations of a multiplex of at least two media packet streams. Method 300 starts by step 310 of receiving, over a low jitter communication channel, the multiplex. The multiple media packet streams that form the multiplex are associated with multiple time bases. Usually, each program is associated with a unique time base that differs from the time base of other programs.

Referring to FIGS. 2 and FIG. 4, system 100 receives multi program transport streams from source 22. Source 22 usually receives raw video and audio and converts it to MPEG compliant multiple program transport stream 30. Some of the conversion stages are illustrated in FIG. 4, where a video and audio elementary streams of three distinct programs (200-210) are converted to corresponding multiple PES video and audio packets 220(1)-230(k). The PES packets of all three programs are multiplexed to provide a multi program transport stream 31. Each transport stream packet is associated with a PID (PID1 for the first program, PID2 for the second program and PID3 for the third program), and is associated with a unique time base (illustrated by PCR1 for packets originating from the first program, PCR2 for packets originating from the second program and PCR3 for packets originating from the third program). The transport stream media packets are usually sent to the transmitter over a low jitter communication channel. This channel may be an internal channel in cases where the source and the transmitter are physically integrated, but this is not necessarily so.

Step 310 is followed by step 314 of associating transmitter timing information to the media packets. Referring again to figures 2 and 4, transmitter timestamp unit 110 generates timestamps (without a need to synchronize this timestamp with the media stream time bases) and these timestamps are associated by embedding them into high layer media packets by high layer packet generator 128. The transport stream media packets arc convened by the transmitter to TVICC packets 250. Each TVICC packet 250 has a payload (that includes transport stream packets) and a header 252. Header 252 may include various headers such us Ethernet headers, UDP/IP headers and the like.

Step 314 is followed by step 320 of transmitting the TVICCC packets (that include transport stream packets as well as associated transmitter timing information) over a TVIC channel to a receiver. Referring to FIG. 2, transmitter end communication interface 30 transmits TVICC packets over TVIC channel 40.

Step 320 is followed by step 330 of receiving, by the receiver, the transmitter timing information and the media packets. Referring to FIG. 2 receiver end communication interface 50 receives the TVICC packets that include both transport stream packets and the transmitter timing information, as well as additional information that may be related to multiple layers of communication protocols.

Step 330 is followed by step 340 of providing at least one timing violation compensated stream of media packets in response to the transmitter timing information. Step 340 may include performing timing violation inducing channel de-jittering, in response to the transmitter timing information and the reconstruction of transport stream packets. This step may include extracting, by splicer 152, transmitter timing information and sending it to transmitter PLL 42 for emulating the transmitter time base and eliminating the high jitter introduced by the TVIC channel 40. Accordingly, this step involves extracting selected portions of the TVICC packets, such as transport stream packets 240, and providing these portions to buffering and retrieval unit 58. Splicer 152 may be capable of PID switching, such a to determine a destination buffer for a certain media packet according to the media packet PID.

Buffering and retrieval unit 58 may include multiple buffers that are arranged in a multi-level configuration, such as first level buffer 57 responsive to transmitter timestamps and second level buffer 59 responsive to PCRs. Buffering and retrieval unit 58 may able to store media packets from multiple programs, although FIG. 2 illustrates only a partial description of a path that stores media packets from a single program.

Eventually, after the de-jittering operation (illustrated by first level buffer 57) transport stream packets are sent to a second level buffer (illustrated by second level buffer 59) and then retrieved and sent to decoder 60 in response to their PCR values. It is noted that for simplicity of explanation the retrieval units are illustrated only the timing information that are connected to the second and first level buffers.

According to an embodiment of the invention the transmitter is included within one Broadband Multimedia Router, while the receiver is included within another remote Broadband Multimedia Router, that are connected to each other via an Ethernet communication channel. Some aspects of the Broadband Multimedia Router are illustrated at U.S. Pat. No. 6,434,141 of Oz et el, that is incorporated herein by reference.

It will be appreciated by persons skilled in the art that the present invention is not limited to what has been particularly shown and described hereinabove. Rather the scope of the present invention is defined only by the claims, which follow.

We claim:

1. A system for compensating for timing violations of a multiplex of at least two media packet streams, the system comprises:
a transmitter, operated to receive the multiplex, to associate transmitter timing information to media packets that belong to the multiplex, and to transmit the media packets and the associated transmitter timing information towards a receiver, over a timing violation inducing communication channel; wherein the transmitter comprises a transmitter time base generator that is adapted to generate the transmitter timing information without synchronizing to any to time bases associated with the media packet streams; whereas the at least two media packet streams are associated with multiple time; and
a receiver, operated to receive the transmitter timing information and the media packets, and to provide at least one timing violation compensated media packet stream in response to the transmitter timing information.

2. The system according to claim 1 further comprises a decoder for decoding the at least one timing violation compensated media packet stream.

3. The system of claim ~1 wherein the receiver comprises a phased lock loop (PLL) for reconstructing the transmitter time base.

4. The system of claim 1 wherein the transmitter is operated to encapsulate said media packets and the transmitter timing information in a communication channel format packets.

5. The system of claim 4, wherein the communication channel format packets does not comprise RTP compliant headers.

6. The system of claim 4 wherein the transmitter is operated to include the transmitter timing information within a communication channel format packet header.

7. The system of claim 1 wherein the receiver comprises: a receiving end communication interface, connected to a splicer, wherein said receiving end communication interface receives said communication channel format packets from the timing violation inducing communication channel, wherein said receiving end communication interface provides said communication channel format packets to said splicer; and wherein the splicer is operated to extract the transmitter timestamp to provide it to a receiver PLL and to extract the media packets.

8. The system of claim 1 wherein at least one media stream packet IS MPEG compliant.

9. A system for reducing jitter of a multiple program transport stream, the system comprises:
a transmitter, operated to receive the multiple program transport stream from a low jitter communication channel, to associate a transmitter timing information to the packets of the multiple program transport stream, and to transmit the packets of the multiple program transport stream and the associated transmitter timing information over a high jitter communication channel towards a receiver; wherein the transmitter comprises a transmitter time base generator that is operated to generate a transmitter time base without synchronizing to any of at least two different time bases of at least two media packet streams of the multiple program transport stream; and a receiver, coupled to the transmitter over the high jitter communication channel, the receiver is operated to receive the transmitter timing information and the packets of the multiple program transport stream, and to provide at least one low jittered program in response to the transmitter timing information.

10. The system according to claim 9 further comprising a decoder for decoding the at least one program.

11. The system of claim 9, wherein the receiver comprises a phased lock loop (PLL) for reconstructing the transmitter time base.

12. The system of claim 9 wherein the receiver comprises: a receiving end communication interface that receives media packets from the high jittered communication channel and provides the media packets to a splicer; and wherein the splicer is operated to extract transmitter timing information as well as transport stream packets from the media packets.

13. A method for compensating for timing violations of a multiplex of at least two media packet streams, the method comprising the steps of:
(a) generating the transmitter timing information, wherein the step of generating does not involve synchronizing to a time base associated with any of the media packet streams; (b) receiving the multiplex; (c) associating transmitter timing information to
media packets that belong to the multiplex; (d) transmitting the media packets and the associated transmitter timing information towards a receiver, over a timing violation inducing communication channel; whereas the at least two media packet streams are associated with different time bases; (e) receiving the transmitter timing information and the media packets; and
(f) providing at least one timing violation compensated media packet stream in response to the transmitter timing information.

14. The method of claim 13 further comprising a step of decoding the at least one timing violation compensated media packet stream.

15. The method of claim 13 wherein the step of providing comprises a step
of reconstructing a transmitter time base from the transmitter timing information.

16. The method of claim 13 further comprising a step of converting media packets of the multiplex to communication channel format packets; whereas the communication channel format packets comprise the transmitter timing information.

17. The method of claim 16 wherein the communication channel format packets do not comprise RTP compliant headers.

18. The method of claim 13 wherein at least one media stream packet is MPEG compliant.

19. The method of claim 13 wherein the multiplex is received over a low jitter communication channel.

* * * * *